UNITED STATES PATENT OFFICE.

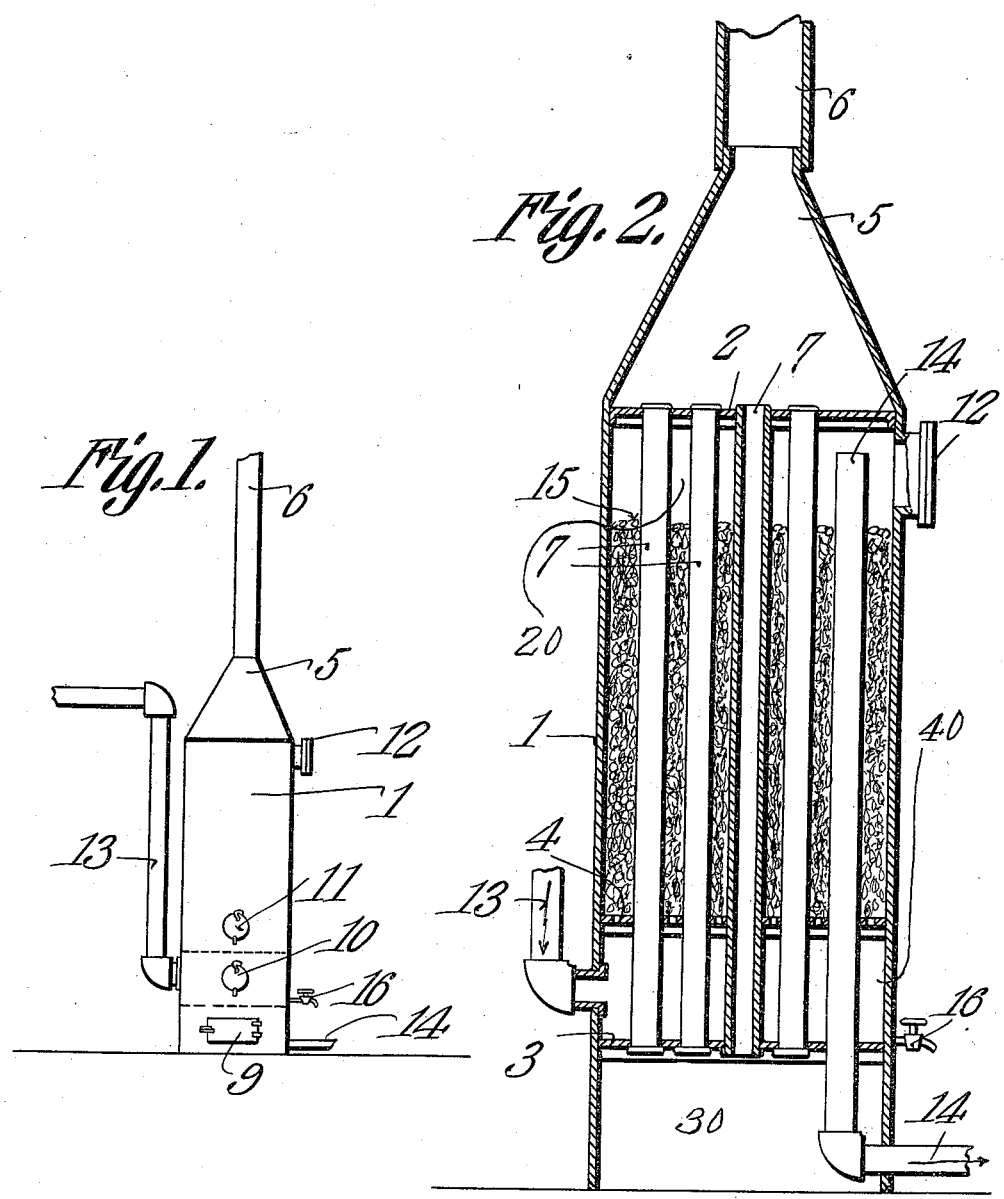

WILLIAM McARTHUR, OF TENINO, WASHINGTON.

GAS-SCRUBBER.

975,054.

Specification of Letters Patent.  Patented Nov. 8, 1910.

Original application filed January 15, 1909, Serial No. 472,518. Divided and this application filed July 24, 1909. Serial No. 509,395.

*To all whom it may concern:*

Be it known that I, WILLIAM MCARTHUR, a citizen of the United States, residing at Tenino, in the county of Thurston and State of Washington, have invented a new and useful Scrubber, of which the following is a specification.

This invention has reference to improvements in scrubbers for use in manufacturing gas and is designed particularly for use in a means for manufacturing gas from lignite, more particularly of the type found in the northwestern part of the United States, though not necessarily confined to the particular type of lignite mentioned.

The present invention was shown and described in an application for Letters Patent No. 472,518 filed by me on January 15, 1909 for means for manufacturing gas, and is a division of the aforesaid application.

In accordance with the means for manufacturing gas disclosed in the said prior application there was shown a retort for producing the gas from lignite, a separator connected to the retort, a scrubber connected to the separator and a purifier and gas holder connected to the scrubber.

The construction of the scrubber forms the subject matter of the present application and the object of the present invention is to provide a scrubber particularly adapted for use in connection with a gas manufacturing plant designed to produce gas for illuminating and heating purposes from lignite of the character mentioned, the gas requiring different treatment than is the case with gas produced from coal.

The invention will be best understood from a consideration of the following detail description taken in connection with the accompanying drawings forming a part of this specification, in which drawings—

Figure 1 is an elevation of a scrubber such as is especially adapted for use in connection with the plant referred to. Fig. 2 is a central vertical section, with parts in elevation, of the scrubber shown in Fig. 1, the drawing however being on a larger scale.

Referring to the drawings, there is shown a scrubber body 1 in the form of an upright cylinder or casing having a head 2 at its upper end and another head 3 near its lower end and adjacent to the head 3 but spaced therefrom above the said head 3 is a plate 4 having a perforated body and holes through it larger than the perforations for a purpose to appear below.

Above the head 2 there is applied to the cylinder or casing 1 a conical hood 5 leading to a stack 6 which latter may be as high as is desired to produce a suitable draft.

Upright flues 7 extend through and are fixed in the heads 2 and 3 and communicate with the spaces above and below them respectively, and between said heads these flues pass through holes in the plate 4 and throughout the coke chamber 20 between it and the upper head.

The air space 30 below the head 3 may be put into communication with the external air through an opening capable of being closed by a suitable damper or door 9.

Access to the drain chamber 40 between the head 3 and the perforated plate 4 may be had through a suitable manhole covered by a plate 10 while another manhole 11 is provided for permitting access to the lower end of the coke chamber 20 between the head 2 and the plate 4. Still another manhole provided with a cover 12 is located near the upper end of the chamber 20 between the head 2 and plate 4.

A pipe 13 enters the scrubber in the drain chamber 40 between the head 3 and the perforated plate 4, this pipe coming from the separator shown and described in the aforesaid application. There is provided within the scrubber another pipe 14 having an open end close to the head 2 but below the same and this pipe preferably extends down through the chamber 40 and thence out through the casing 1 and leads to a suitable purifier before the gas is permitted to enter a gasometer.

The chamber 20 between the head 2 and the perforated plate 4 is nearly filled with pieces of coke as indicated at 15 and the chamber 40 between the head 3 and the perforated plate 4 is provided with a drain-off valve 16.

In the operation of the system described in the aforesaid application for Letters Patent the gas coming from the retort passes through the separator so that the tarry matters and the greater portion of the water, which latter is very abundant in the lignite found in the northwestern section of the United States, is condensed while the lighter products of distillation pass on through the pipes 13 into the interior of the scrubber.

The interior of the scrubber is maintained in a cold condition by an air draft continuously passing through the pipes or flues 7 and the remaining condensable matters find their way into the drain chamber between the head 3 and the perforated plate 4, passing into this chamber through the said perforated plate 4, and these condensable matters may be withdrawn from time to time through the valve 16.

The draft through the flues 7 may be regulated as necessary by opening or closing the damper 9 to a greater or less extent and this draft, when the door 9 is fully open, may be made very pronounced by a sufficient elongation of the stack 6.

What is claimed is:

A scrubber for the purpose described, comprising an upright casing 1 with heads 2 and 3 near its extremities, a conical hood 5 above the upper head and leading to a stack, a damper 9 communicating with the air space 30 beneath the lower head, a plate 4 extending completely across the casing above said head and having both perforations and holes through its body and forming a coke chamber 20 between it and the upper head and a drain chamber 40 between it and the lower head, a drain-off valve 16 opening from said drain chamber, a series of upright flues 7 extending through and fixed in both heads and passing between them through the holes in said intermediate plate, a gas inlet pipe 13 communicating with the drain chamber, a gas outlet pipe 14 entering the casing into the air space and leading thence upward through the drain chamber and throughout the coke chamber and communicating with the interior thereof near its upper end, and a mass of coke superimposed upon the perforated body of said plate 4 around the flues and rising nearly to the inner end of said outlet pipe.

In testimony that I claim the foregoing as my own, I have hereto affixed my signature in the presence of two witnesses.

WILLIAM McARTHUR.

Witnesses:
P. C. KIBBE,
J. G. TUSTEN.